US009805527B2

(12) United States Patent
Gupta

(10) Patent No.: US 9,805,527 B2
(45) Date of Patent: Oct. 31, 2017

(54) INTELLIGENT LOGGING

(71) Applicants: VOLKSWAGEN AG, Wolfsburg (DE); AUDI AG, Ingolstadt (DE)

(72) Inventor: Somudro Gupta, Belmont, CA (US)

(73) Assignees: Volkswagen AG (DE); Audi AG (DE)

(*) Notice: Subject to any disclaimer, the term of this patent is extended or adjusted under 35 U.S.C. 154(b) by 42 days.

(21) Appl. No.: 14/994,897

(22) Filed: Jan. 13, 2016

(65) Prior Publication Data

US 2017/0200330 A1 Jul. 13, 2017

(51) Int. Cl.
*G01M 17/00* (2006.01)
*G07C 5/08* (2006.01)
*G05D 1/00* (2006.01)
*G06F 3/06* (2006.01)

(52) U.S. Cl.
CPC ........... *G07C 5/085* (2013.01); *G05D 1/0088* (2013.01); *G06F 3/0604* (2013.01); *G06F 3/0634* (2013.01); *G06F 3/0653* (2013.01); *G06F 3/0685* (2013.01)

(58) Field of Classification Search
CPC .... G07C 5/085; G05D 1/0088; G06F 3/0604; G06F 3/0634; G06F 3/0653; G06F 3/0685
USPC ................................ 701/33.4, 36, 33.6, 34.3
See application file for complete search history.

(56) References Cited

U.S. PATENT DOCUMENTS

2007/0075919 A1* 4/2007 Breed .................. B60R 21/013
345/8
2007/0271014 A1* 11/2007 Breed ..................... B60J 10/00
701/31.9

OTHER PUBLICATIONS

Batista De Oliveira; Software Architecture for Autonomous Vehicles; Higher Technical Institute; Technical University of Lisbon; entire document; Oct. 2009.
Leung; Software and Control Architecture Development of an Autonomous Vehicle; Proceedings of ASME 2006 International Student Conference; Istanbul, Turkey; entire document May 26-28, 2006.

* cited by examiner

*Primary Examiner* — Gertrude Arthur Jeanglaude
(74) *Attorney, Agent, or Firm* — Barnes & Thornburg LLP

(57) ABSTRACT

An on-board computing system for determining an opportune time to log data into a first memory. A sensor system collects data of a vehicle's environment. A controller of the on-board computing system logs the data to a first memory when it determines an opportune time to log data to the first memory. The controller holds data in a second memory if it determines it is not an opportune time to log data into the first memory. The controller resumes logging data to the first memory when an opportune time presents itself.

20 Claims, 5 Drawing Sheets

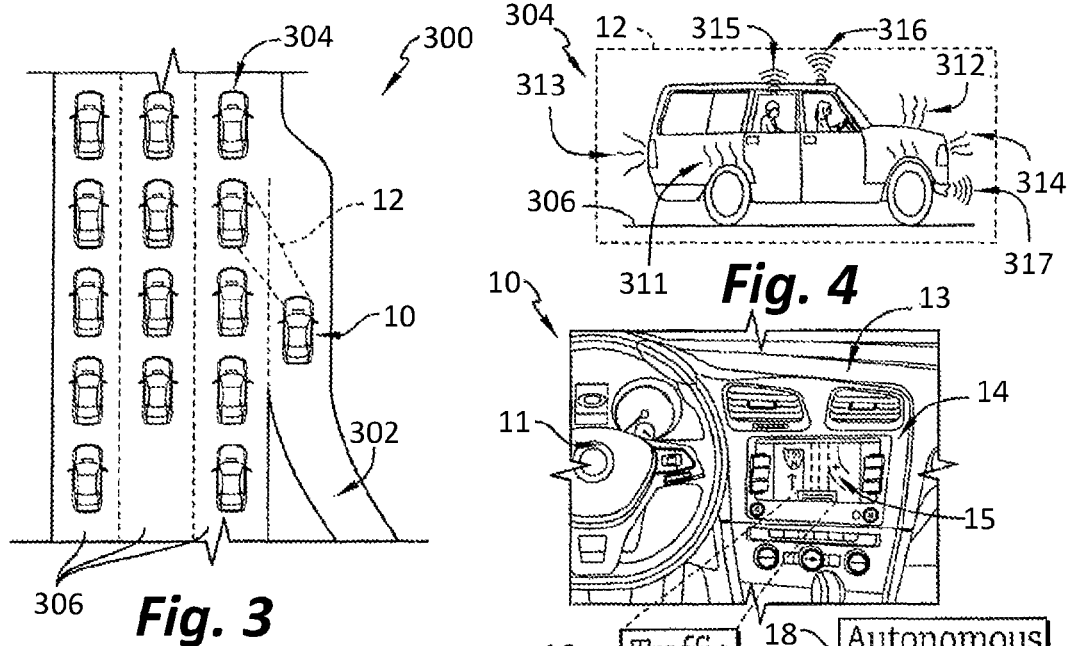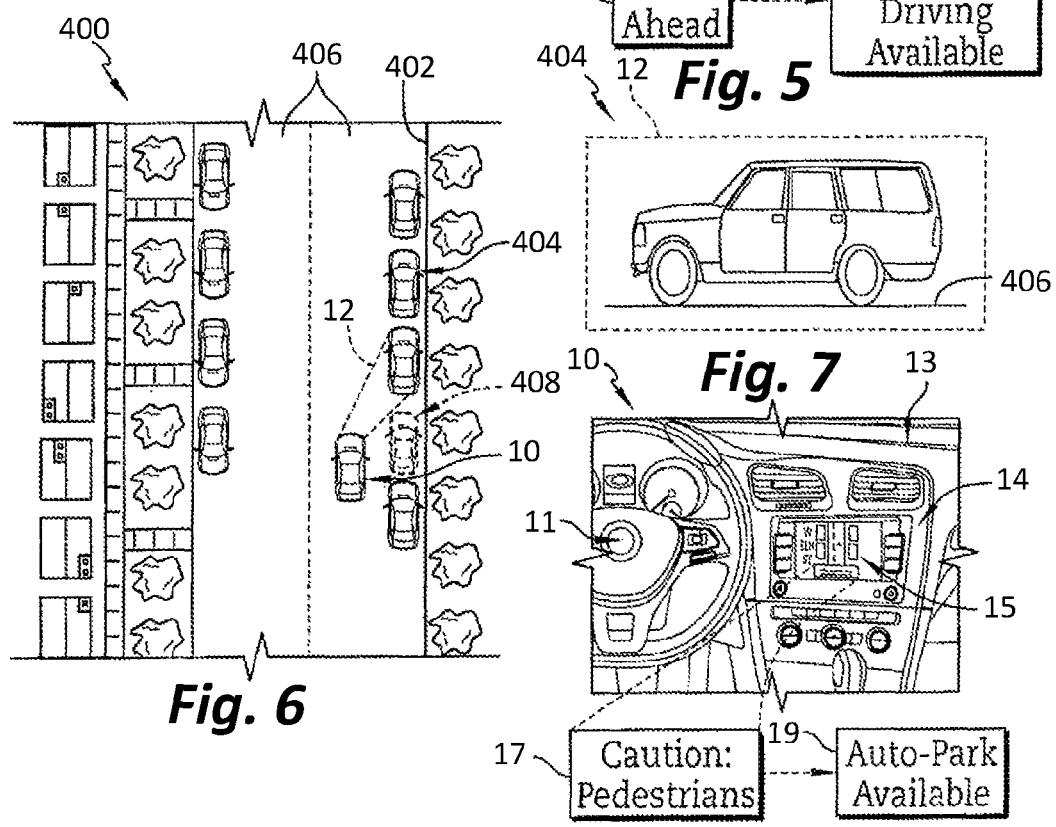

INTELLIGENT LOGGING

BACKGROUND

The present disclosure relates to systems, components, and methodologies for logging data through sensors in a vehicle. More particularly, the present disclosure relates to systems, components, and methodologies that improve logging data through sensors in a vehicle in situations such as a high traffic density environment.

SUMMARY

According to the present disclosure, systems, components, and methodologies are provided for logging data in an intelligent manner to reduce the computational load on an on-board computing system.

In illustrative embodiments, an on-board computing system of an autonomous vehicle assesses the criticality of a situation before determining whether or not to log data to a first memory or hold data in a second memory until a more opportune time presents itself to log data to a first memory. This is because logging data to a first memory that may be embodied as a hard drive is orders of magnitude slower than holding data in a second memory that may be embodied as RAM. The second memory in this case can be accessed hundreds of times faster than the first memory. Therefore, in potential critical situations when a faster cycle of processing is needed, the second memory holds the data in order to speed up the process of data logging during that duration in order to address the potential critical situation.

The assessment of criticality of the situation may be based upon a determination if a number of objects in the near vicinity of the autonomous vehicle exceed a predetermined threshold value. The assessment of criticality of the situation may also be based upon a determination if a predicted time to collision of the autonomous vehicle with another object falls below a predetermined threshold value. If there is a determined potential critical situation, the on-board computing system holds data in the second memory to reduce the computational load and allow the on-board computing system to react faster to a potential critical situation.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 depicts an autonomous vehicle having an autonomous driving system in accordance with the present disclosure, and shows that the autonomous driving system includes cameras that collect image data that can be used to assess the criticality of the situation;

FIG. 2 is a diagrammatic view of an on-board computer system in accordance with the present disclosure that includes one or more data collectors configured to collect data related to vehicle environment, one or more modules representing the various systems of the vehicle, a controller to process the data collected and log the data into first memory after an assessment of the criticality of the situation;

FIG. 3 depicts a stretch of highway with a group of secondary vehicles in a traffic jam wherein the autonomous vehicle is entering the highway and analyzing the secondary vehicles to assess the criticality of the situation in order to determine whether or not to log data of the vehicle environment in accordance with the present disclosure;

FIG. 4 is a detail view of FIG. 3 taken from the perspective of the autonomous vehicle which shows one of the secondary vehicles from the group of secondary vehicles, wherein identifying features including light emissions, thermal emissions, audio emissions, radio emissions, and other identifiers are collected by the primary vehicle to log data of the vehicle environment and analyzed to determine the distance, relative velocity, relative acceleration, and predicted time to collision with the secondary vehicle in order to assess the criticality of the situation in accordance with the present disclosure;

FIG. 5 is a partial perspective view of an interior of the autonomous vehicle which depicts a navigation screen displaying the present location of the autonomous vehicle, wherein the navigation screen is displaying messages to indicate to a user of the autonomous vehicle that a traffic jam is ahead and as a result may halt logging of data to memory until an assessment of the criticality of the situation is resolved in accordance with the present disclosure;

FIG. 6 depicts a stretch of residential roadway with a group of secondary vehicles parked along a side of the roadway, wherein the autonomous vehicle is driving along the roadway to park along the side of the roadway and analyzing the secondary vehicles to assess the criticality of the situation in order to determine whether or not to log data of the vehicle environment in accordance with the present disclosure;

FIG. 7 is a detail view of FIG. 6 taken from the perspective of the autonomous vehicle which shows one of the secondary vehicles from the group of secondary vehicles, wherein identifying features regarding the secondary vehicle's status including light emissions, thermal emissions, audio emissions, radio emissions, and other identifiers are collected by the autonomous vehicle to determine a status of the secondary vehicle to log data of the vehicle environment and analyzed to determine the distance, relative velocity, relative acceleration, and predicted time to collision with the secondary vehicle in order to assess the criticality of the situation in accordance with the present disclosure;

FIG. 8 is a partial perspective view of the interior of the autonomous vehicle which depict the navigation screen displaying the present location of the autonomous vehicle, wherein the navigation screen is displaying messages to indicate to a user of the autonomous vehicle that pedestrians may be present in the area and as a result may halt logging of data to memory until an assessment of the criticality of the situation is resolved in accordance with the present disclosure;

FIG. 9A depicts the autonomous vehicle assessing the criticality of the situation and determining whether or not to log data of the vehicle environment based upon an assessment of the time to collision to a neighboring vehicle;

FIG. 9B depicts the autonomous vehicle assessing the criticality of the situation and determining whether or not to log data of the vehicle environment based upon an assessment of the potential time to collision to a neighboring vehicle;

FIG. 9C depicts the autonomous vehicle assessing the criticality of the situation and determining whether or not to log data of the vehicle environment based upon an assessment of the number of objects in the near vicinity.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
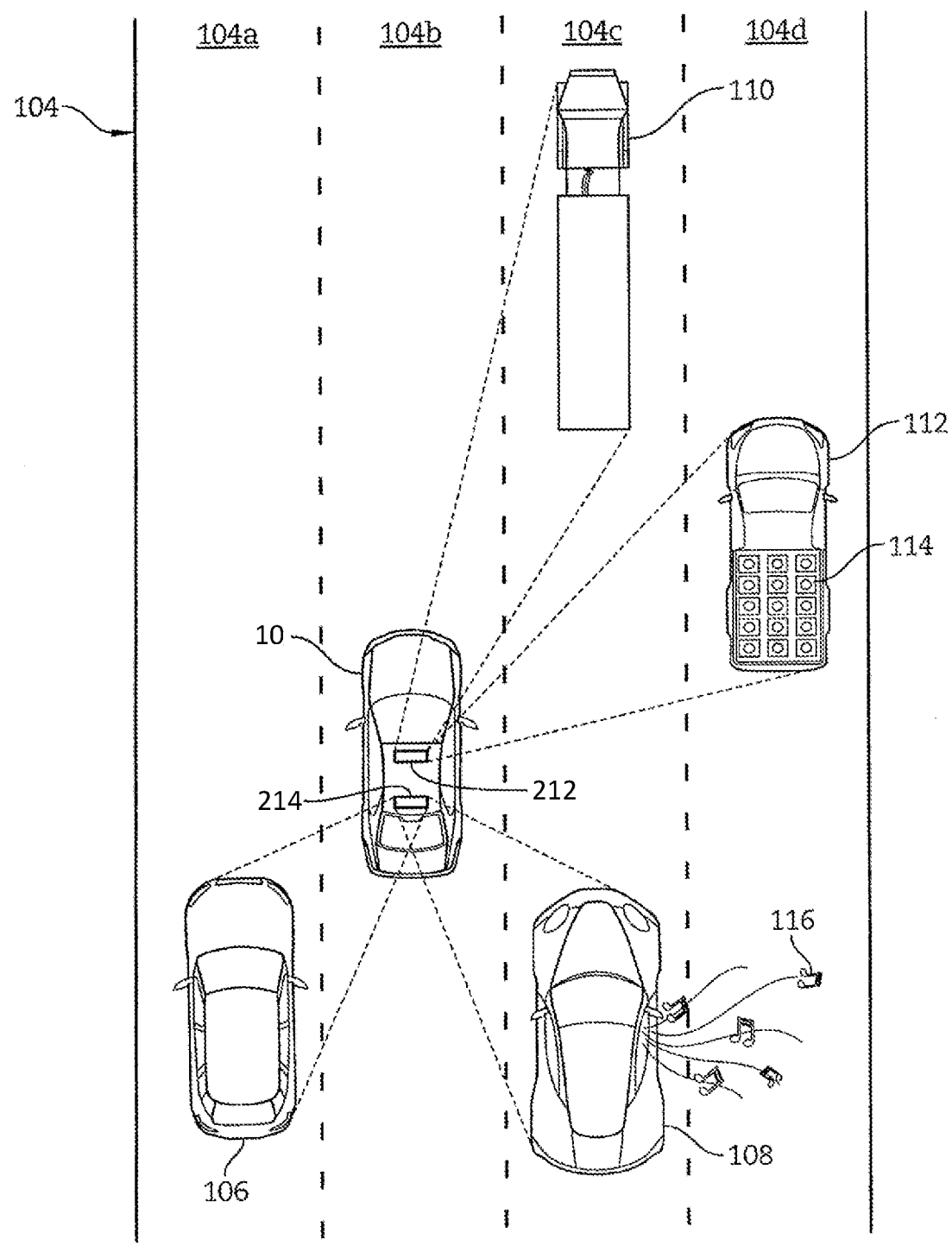

FIG. 1 depicts an autonomous vehicle 10 driving on a roadway 104 having four lanes 104a, 104b, 104c, and 104d. Several neighboring vehicles 106, 108, 110, and 112 are driving in proximity of the autonomous vehicle 10, wherein neighboring vehicle 112 carries an exposed cargo 114.

The autonomous vehicle 10 may include an on-board computing system 200 (depicted in FIG. 2 and to be described in more detail below). The on-board computing system 200 may include a front camera 212 and a rear camera 214 that may capture image data 12 of the proximity of the autonomous vehicle 10. Thus, for example, the front camera 212 may capture image data 12 of the neighboring vehicles 110 and 112, both of which may be located generally forward of the vehicle 10. Similarly, the rear camera 214 may capture image data 12 of the neighboring vehicles 106 and 108, both of which may be located generally rearward of the vehicle 10.

The on-board computing system 200 may use image data 12 of the neighboring vehicles 106, 108, 110, and 112 to develop an assessment of criticality of a given situation to determine if is an opportune time to log data 12 into a first memory 208 or hold data 12 in a second memory 206. The assessment of criticality of the situation may include identifying objects in the near vicinity of the autonomous vehicle 10 to see if the number of objects exceeds a predetermined threshold value. The assessment of criticality of the situation may also include evaluating a time to collision with a neighboring vehicle 106, 108, 110, or 112 to determine if the time to collision falls below a predetermined threshold value. In the illustrative embodiment, if it is deemed not to be an opportune time to log data 12 into a first memory 208 based on the assessment of criticality because the predetermined threshold value was exceeded, then second memory 206 may hold data 12 until an opportune time presents itself, i.e., the threshold is not exceeded. The on-board computing system 200 may also compare the amount of space on second memory 206 and the assessment of criticality of the situation to determine if it is necessary to log data 12 into first memory 208.

As a result, the on-board computing system 200 may provide improved safety and efficiency. With respect to safety, the on-board computing system 200 enables the autonomous vehicle 10 to log data 12 in a situation where it is less likely to collide with a neighboring vehicle 106, 108, 110, or 112. With respect to efficiency, the on-board computer system 200 logs data 12 in situations that are less computationally intensive on the processor 204 to process the data 12 and store the data 12 into first memory 208.

Figure 2:
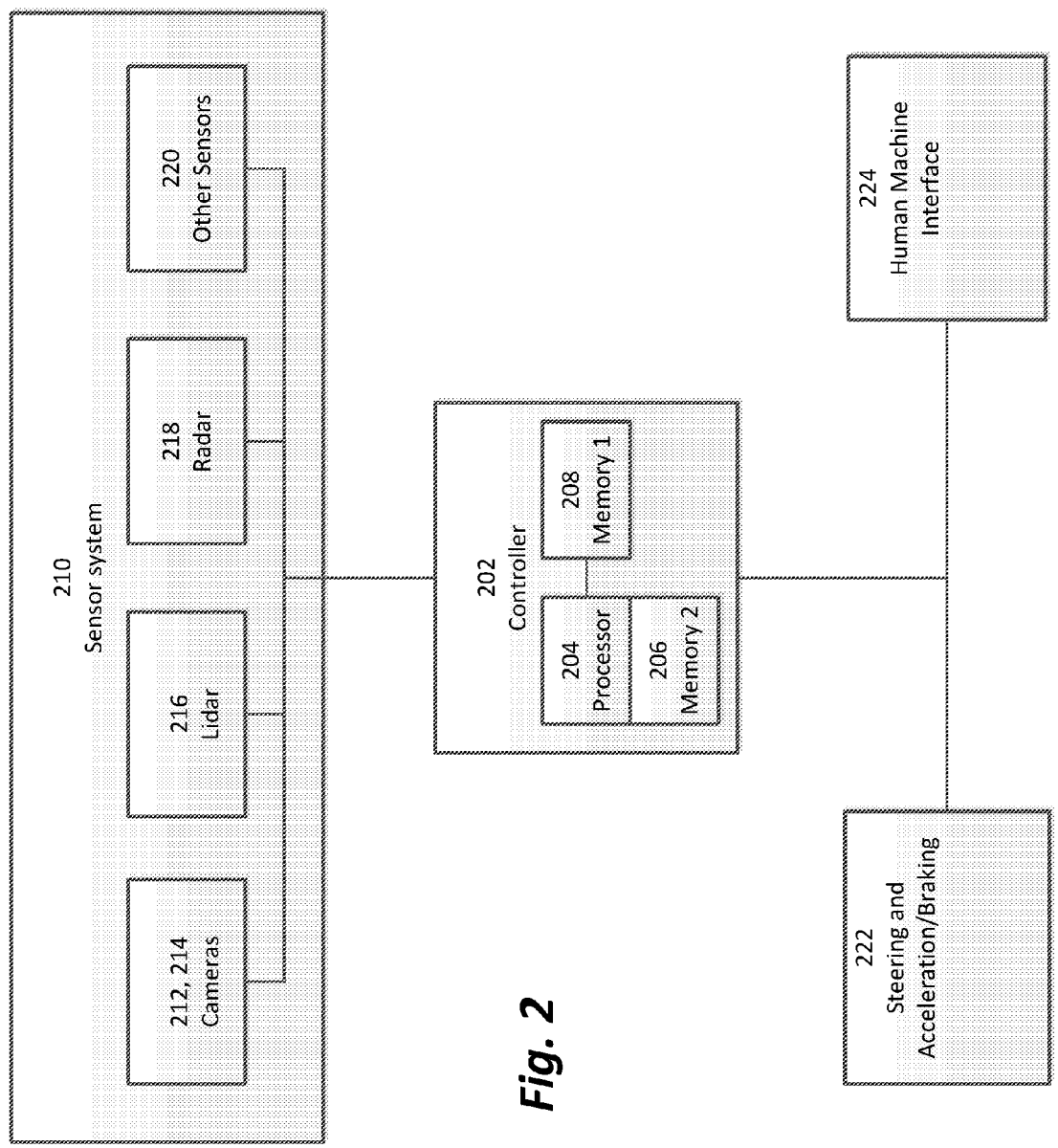

FIG. 2 is a diagrammatical view of the illustratively embodied on-board computing system 200 in accordance with the present disclosure. The on-board computing system 200 may include the controller 202 having a processor 204, first memory 208, and a second memory 206. In accordance with a main embodiment, the on-board computing system 200 may also include a sensor system 210 that includes the previously described cameras 212, 214, Lidar 216, radar 218, and other sensors 220. The illustratively embodied on-board computing system 200 may also include a steering and acceleration/braking system 222 and a human machine interface 224, side mirror adjustment system with proximity detectors, a headlight control system with proximity detectors, a window control system with proximity detectors, an information and entertainment system with proximity detectors, a climate control system with proximity detectors, a gear and power train adjustment system with proximity detectors, an audio control system, and a multifunction display control system. Lidar technology collects data using remote sensing technology to measure distance by illuminating a target with a laser and analyzing the reflected light.

In other, additional and/or optional embodiments, the other sensors may include, for example, microphones, air and particulate detector, etc.

In accordance with disclosed embodiments, controller 202 may be electrically coupled to the sensor system 210 and the electrical systems 220, 222, 224, 226, 228, 230, 232, and 234. The electrical connections can be made using any mechanism known in the art, such as a communication bus.

The illustratively embodied on-board computing system 200 may use the controller 202 to process the electrical systems 222 and 224 and the sensor system 210 to send data 12 to the controller 202 to log into first memory 208 or hold data 12 in second memory 206 until the processor 204 can log data 12 in first memory 208.

FIG. 3 depicts a highway 300 having an on-ramp 302 connecting with lanes 306 of highway 300. An autonomous vehicle 10 entering highway 300 from an on-ramp 302 may capture data 12 regarding secondary vehicles 304 on highway 300. The data 12 may be used to assess the criticality of the situation to determine if it is an opportune time to log the data 12 into first memory 208 or hold the data 12 in second memory 206 until an opportune time presents itself. For example, if the amount of secondary vehicles 304 exceeds a predetermined threshold value, then the autonomous vehicle 10 may stop logging data 12 regarding its environment.

In the illustrative embodiment of FIG. 3, data 12 may include information regarding thermal emissions 311, 312, light emissions 313, 314, audio emissions 315, and radio emissions 316, 317 from secondary vehicle 304, as illustrated in FIG. 4. These emissions 311-317 may be logged by the autonomous vehicle 10 to analyze parameters indicative to activity in a vehicle environment (e.g. the surrounding thermal data, the surrounding light data, the surrounding audio data, etc.). In some embodiments, data 12 regarding multiple secondary vehicles 304 in a group of adjacent secondary vehicles 304 may be captured to analyze the parameters indicative of the activity in the vehicle environment (e.g. the surrounding thermal data, the surrounding light data, the surrounding audio data, etc.). The data 12 may be used to determine the distance, relative velocity, relative acceleration, and predicted time to collision with the secondary vehicles 304 in order to assess the criticality of the situation to determine if it is an opportune time to log data 12 into the first memory 208 or hold data 12 in the second memory 206 until an opportune time presents itself as described in the disclosure.

In the illustrative embodiment, a notification 16 of traffic ahead may be displayed to a user of the autonomous vehicle 10 if the probability that adjacent secondary vehicles 304 are in a traffic jam, as determined by the on-board computing system 200, reaches or exceeds a predetermined threshold limit as shown in FIG. 5. In some embodiments, a prompt 18 may be displayed to the user to activate an autonomous driving function of vehicle 10 which may operate when vehicles 10, 304 are in a traffic jam. In some embodiments, identification of a traffic jam may prompt autonomous vehicle 10 to send location data 12 to a server for mapping traffic patterns. Other uses for identification of traffic jams are also contemplated.

FIG. 6 depicts a residential roadway 400 having lanes 406. Autonomous vehicle 10 driving on roadway 400 may capture data 12 regarding secondary vehicles 404 positioned alongside a curb 402 of right-side lane 406. An opening 408 for autonomous vehicle 10 to park in may also be identified as part of an auto-park function of autonomous vehicle 10 if it is determined that secondary vehicles 404 are also parked. The data 12 may be used to determine the distance, relative velocity, relative acceleration, and predicted time to collision with the secondary vehicles 404 in order to assess the criticality of the situation to determine if it is an opportune time to log the data 12 into first memory 208 or hold the data 12 in second memory 206 until an opportune time presents itself. For example, if the amount of secondary vehicles 404 exceeds a predetermined threshold value then the autonomous vehicle 10 may stop logging data 12 of its environment. However, in an illustrative embodiment, the on-board computing system 200 may determine that it is safe to log data 12 in first memory 208 if there is a low potential for a collision as a result of the secondary vehicle 404.

As shown in FIG. 7, data 12 captured by autonomous vehicle 10 may indicate that secondary vehicle 404 lacks any active-status indicators, making the probability unlikely that secondary vehicles 404 are a possible object to collide with. As a result, the on-board computing system 200 may log data 12 to first memory 208 after assessing the criticality of the situation. Location data 12 of autonomous vehicle 10 may indicate that the autonomous vehicle 10 is travelling on a residential roadway 400, as depicted in FIG. 8, which may confirm that the probability of secondary vehicles 404 being part of a traffic jam is low and more likely that the secondary vehicles 404 are actually parked.

In the illustrative embodiment, a notification 17 that pedestrians may be present may be displayed to a user of autonomous vehicle 10 if it is determined by the on-board computing system 200 that secondary vehicles 404 are parked on a residential or other non-controlled access roadway as shown in FIG. 8. A detection that a number of pedestrians may be present may cause the on-board computing system 200 to stop logging data 12 in first memory 208 and hold data in second memory 206 as a result of the number of objects in the vicinity of the autonomous vehicle exceeding a predetermined threshold value. In some embodiments, a prompt 19 may be displayed to the user to activate the auto-park function of vehicle 10 to guide autonomous vehicle 10 into opening 408. In some embodiments, access to the autonomous driving function of autonomous vehicle 10 may be blocked or prohibited if it is determined that autonomous vehicle 10 is on a residential or other non-controlled access roadway.

In an illustrative embodiment, the autonomous driving function of a primary vehicle may use Lidar or radar based cruise control to maintain spacing from other secondary vehicles on the roadway. However, such a Lidar or radar based system may not be able to distinguish objects smaller than a vehicle, such as a pedestrian or bicycle user. In such an embodiment, access to the autonomous driving function may be blocked, or prohibited, if the primary vehicle is on a non-controlled access roadway where pedestrians are likely to be present.

The on-board computing system 200 may include certain components for detecting and analyzing characteristics of secondary vehicles 304, 404. A sensor system 210 may be provided on autonomous vehicle 10 and configured to capture data 12 including emissions 311-317 of secondary vehicles 304, 404. In an illustrative embodiment, sensor system 210 may include the cameras 212, 214 for obtaining image data 12 regarding light emissions 313, 314 and image data 12 regarding thermal emissions 311, 312, such as through infrared signals for example, and a radio receiver for obtaining signal data 12 regarding radio emissions 316, 317 coming from secondary vehicles 304, 404. Sensor system 210 may be coupled to autonomous vehicle 10 in an area where a wide range of views are visible, such as, for example, a bumper, hood, roof, side mirror, rear-view mirror, front fascia, or dashboard 13 of autonomous vehicle 10, etc.

In some embodiments that include optional sensors, audio emissions 315 include passenger voices, such as indicated at 315 in FIG. 4, sounds from an entertainment system, engine noise, and braking noise, to name a few. In some embodiments, radio emissions 316, 317 include distance sensor signals, ultrasonic parking signals, blind spot radar, and adaptive cruise control radar such as indicated at 317, wi-fi signals, BLUETOOTH™ signals, cellphone signals, and entertainment system signals, such as indicated at 316, to name a few. In some embodiments, light emissions 313, 314 may include tail or brake light emissions, such as indicated at 313, headlamp or turn signal emissions, such as indicated at 314, and internal cabin light emissions, etc. In some embodiments, thermal emissions 311, 312 may include brake heat emissions, such as indicated at 311, engine heat emissions, such as indicated at 312, cabin heat emissions, and exhaust heat emissions, etc.

Moreover, in accordance with such embodiments, a microphone may be used to detect audio emissions 315 from particular neighboring vehicles. Typical driving patterns of secondary vehicles 304 or 404 may be informed by audio emissions 315. For example, if a neighboring vehicle 304 or 404 may be emitting sounds suggesting engine trouble, the on-board computing system 200 may determine that the neighboring vehicle 304 or 404 could suddenly decelerate or pull over. If a neighboring vehicle may be emitting sounds suggesting loud music, the on-board computing system 200 may determine that a driver of the secondary vehicle 304 or 404 may be distracted and that the secondary vehicle 304 or 404 may drive erratically. The on-board computing system 200 may use the audio emissions 315 to assess the criticality of the situation and determine that a collision may occur with a secondary vehicle 304 or 404. If the on-board computing system 200 determines that the time to collision falls below a predetermined threshold then the on-board computing system 200 may stop logging data 12 to first memory 208 and hold the data 12 in second memory 206 until a more opportune to log data 12 presents itself.

In accordance with embodiments including such optional sensors, an air and particulate detector may be used to measure air composition through, for example, olfactory analysis, akin to how a human may smell odors in the air representing impurities. If it is determined that a particular secondary vehicle 304 or 404 may be emitting excessive exhaust, the on-board computing system 200 may avoid that neighboring vehicle 304 or 404. The air and particulate detector may be of any type suitable for performing chemical or olfactory analysis to detect impurities typically present in air on roadways. The on-board computing system 200 may use the data 12 collected from the air and particulate detector to avoid needing to collect more data regarding excessive exhaust from a secondary vehicle 304 or 404. Therefore, the computational load of the on-board computing system 200 could be reduced.

The on-board computing system 200 may use the controller 202 to pre-process signals generated by the sensor system 210. For example, the controller 202 may apply filters to signals transmitted by the sensor system 210 to remove noise and isolate meaningful data using signal processing techniques. This could reduce the computational load of logging data 12 to first memory 208 when the on-board computing system 200 deems it an opportune time to log data 12.

Figures 9A, 9B, 9C:
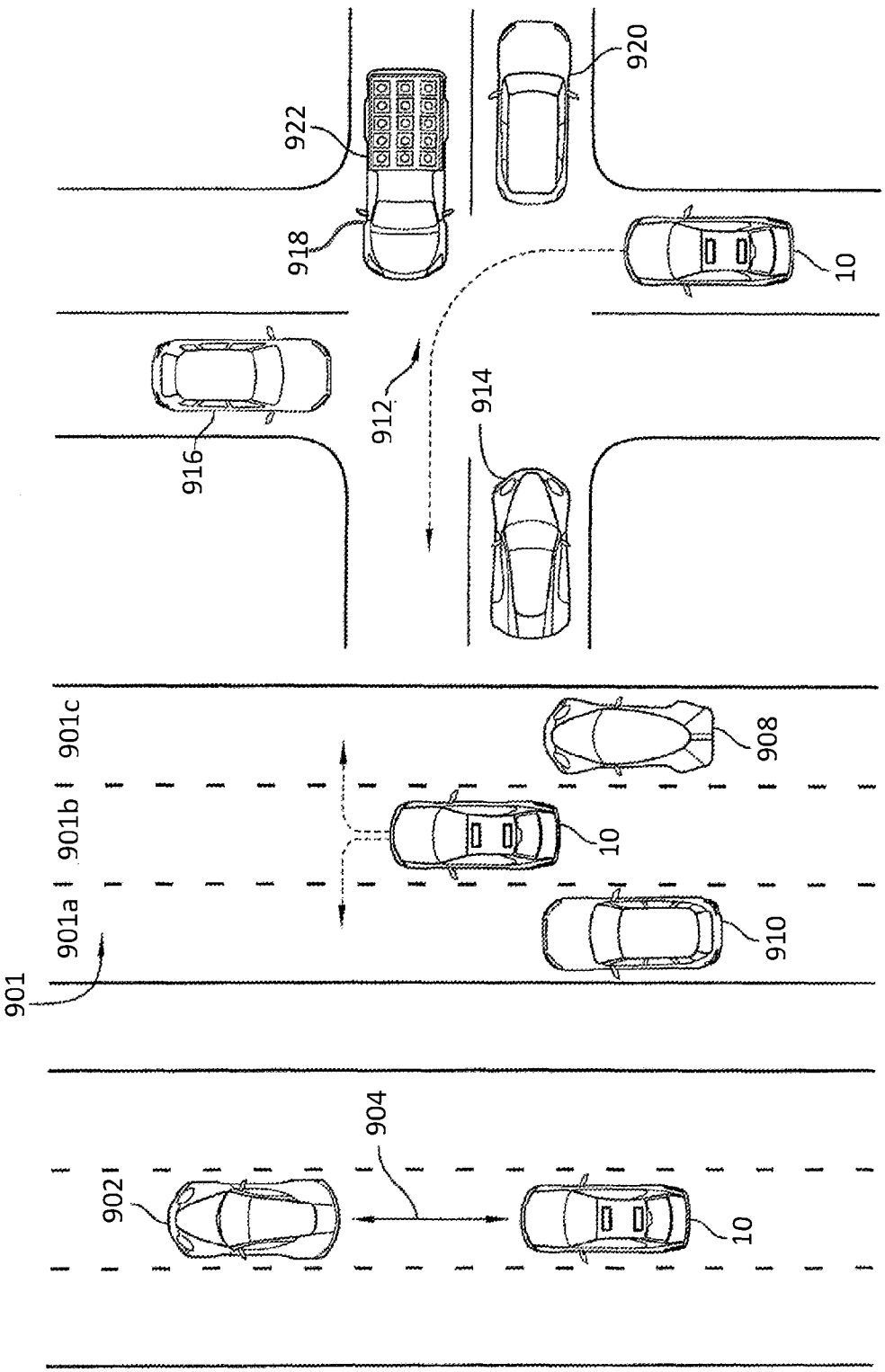
FIG. 9A-9C depicts different scenarios where the assessment of the criticality of the situation may affect the logging of data of the vehicle environment.

FIGS. 9A-9C depict an autonomous vehicle in different driving scenarios. FIG. 9A depicts the autonomous vehicle 10 following a neighboring vehicle 902 at a following distance 904 to the neighboring vehicle 902. The following distance 904 may be used to assess the criticality of the situation and determine if it is an opportune time to log data 12 to first memory 208. The following distance may be used in an evaluation in a potential time to collision assessment. If the on-board computing system 200 determines that the time to collision falls below a predetermined threshold amount then the on-board computing system 200 may stop logging data 12 to first memory 208. If it is determined that a collision is eminent then the autonomous vehicle 10 may continue to log data 12 to first memory 208.

FIG. 9B depicts the autonomous vehicle 10 on a roadway 901 in a middle lane 901b, and suggests that the autonomous vehicle may switch to the left lane 901a or the right lane 901c. There are also neighboring vehicles 908 and 910 in lanes 901c and 901a. The assessment of the criticality of the situation of the autonomous vehicle may determine that a time to collision falls below a predetermined threshold value when switching to either lanes 901a, 901c. In addition, neighboring vehicle 908 or 910 may be driving aggressively and may accelerate and decelerate quickly. The on-board computing system 200 may determine that a potential time to collision may fall below a threshold value because of the aggressive driving nature or a neighboring vehicle 908, 910. As a result of the time to collision falling below a threshold value, the autonomous vehicle 10 may stop logging data 12 to first memory 208 and hold the data 12 in second memory 206 until a more opportune time presents itself.

FIG. 9C depicts the autonomous vehicle 10 at an intersection 912, and suggests that the autonomous vehicle 10 is attempting to execute a left turn. The on-board computing system 200 may assess the criticality of the situation by analyzing all of the objects at the intersection and determine that the number of objects in the nearby vicinity exceeds a predetermined threshold value. In addition, pedestrians may be detected at the intersection 912. The pedestrians may not obey traffic laws and as a result cause the autonomous vehicle 10 to react in a quick manner to avoid colliding with the pedestrians. Furthermore, the neighboring vehicles 914, 916, 918, and 920 may drive in an aggressive manner. This may cause the on-board computing system 200 to assess the criticality of the situation and determine the time to collision falls below a predetermined threshold value. A vehicle 918 may be carrying exposed cargo 922, and the autonomous vehicle 10 may predict that some of the exposed cargo 922 may fall off of the vehicle 918 and be a hazard to avoid. As a result of these scenarios, the on-board computing system 200 may stop logging data 12 to first memory 208 and hold data 12 in second memory 206 until a more opportune time presents itself.

Figure 10:
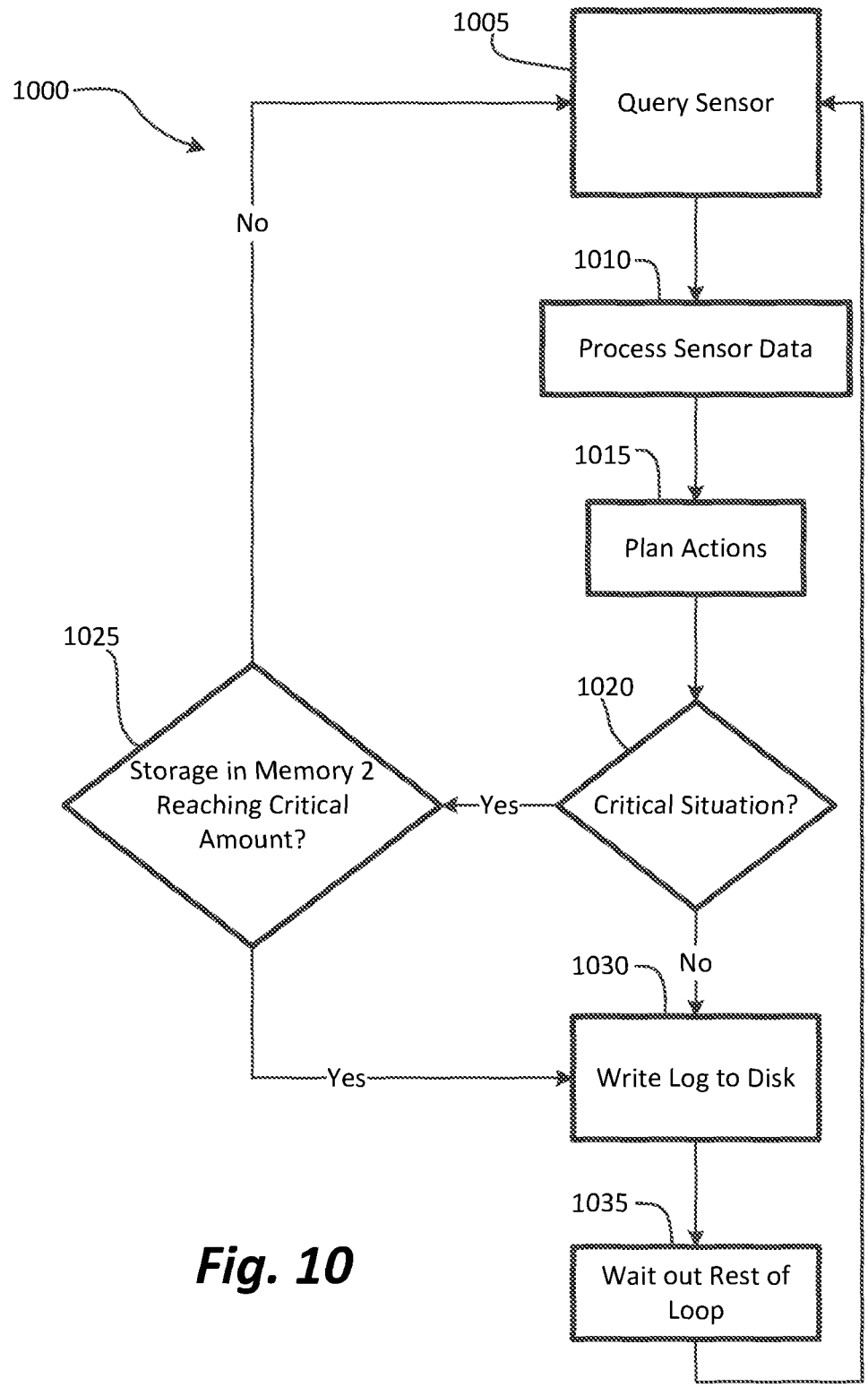
FIG. 10 is a flow diagram illustrating a methodology for assessing criticality of the situation before logging data into memory.

FIG. 10 is a flow diagram 1000 illustrating a methodology for operation of an intelligent logging system in accordance with the present disclosures. The illustrative methodology begins with operation 1005, in which a controller 202 of the on-board computing system 200 queries sensors 212, 214, 216, 218 and 220 of the sensor system 210. After receiving sensor data 12, controller 202 proceeds with operation 1010 and processes sensor data 12. In operation 1015, the controller 202 plans actions in response to the sensor data 12. In this illustrative embodiment, these actions may be related to the functions of the autonomous vehicle 10. In operation 1020, the on-board computing system 200 may determine if there is a critical situation in which a predetermined threshold value has been exceeded. The assessment of the criticality of a situation may be based upon the number of objects in the vicinity of an autonomous vehicle 10 or a time to collision as described above. If there is a critical situation as a result of a predetermined threshold value being exceeded then operation may continue to operation 1025 and data 12 may be held in second memory 206. If not, operation 1030 may be executed and data 12 may be logged into first memory 208.

In operation 1025, there may be an evaluation to see if the data 12 held in second memory 206 is reaching a critical amount and preventing the controller 202 from processing functions for other electrical systems. The sensor data 12 may be held in second memory 206 if it is determined that storage in second memory 206 has not reached a critical amount and operation returns to operation 1005 to restart the process. The frequency of the processing may be increased to improve the reaction time of the autonomous vehicle 10 to potential critical situations. Until operation proceeds to 1030, data may be held in second memory 206. If the controller 202 determines that the data 12 stored on second memory 206 has exceeded a determined threshold value then operations may proceed to operation 1030, and the on-board computing system 200 may start logging data 12 to first memory 208 to reduce the computational load on the on-board computing system 200. After data 12 is logged to first memory 208, operation 1035 may be executed and the on-board computing system 200 may wait out the rest of the loop and then return to operation 1005 to restart the process.

The technical problem that arises when logging data 12 into an autonomous vehicle 10 is the gathering of sensor data 12 becomes computationally intensive. The sensor data 12 is important for system debugging and development. As such, the excessive data 12 logging can place a large burden on the on-board computing system 200 and negatively impact performance because file I/O is performance-intensive for computers. It may even prevent the autonomous vehicle 10 from operating in certain complex scenarios, where massive data 12 gathering is required to properly develop and debug the system in those situations.

Certain conventional solutions to this problem have been to record less data 12 (downsampling or simply leaving out data 12). Other conventional solutions to the problem are to invest in additional computing power dedicated for logging data 12.

To the contrary, the proposed logging innovation approaches the problem in such a way as to provide an improved technical solution by maintaining the amount of data 12 logged using fewer computational resources. Sensor data 12 is held in second memory 206 until an assessment of the criticality of the situation determines that it is an opportune time to log data 12 into the first memory 208. The on-board computing system 200 may assess the calculated performance impact of logging data 12 to the first memory 208 and use that to determine if it is an opportune time to log data 12 to the first memory 208 or hold data 12 in the second memory 206. In critical situations (e.g. lots of surrounding cars, cyclists, pedestrians) where faster cycle times are required, the system may choose to avoid logging data 12 to the first memory 208 until an opportune time presents itself. The described logging data 12 approach reduces the computational resources needed while maintaining the level of data 12 logged for system debugging and development.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An on-board computer system for logging sensor data for an autonomous vehicle, the on-board computer system comprising:
   a plurality of sensors for monitoring sensor data regarding operation of the autonomous vehicle and an environment in which the autonomous vehicle is present;
   a processor for analyzing the sensor data; and
   a first memory in which the monitored data is stored to log the sensor data received from the plurality of sensors of the autonomous vehicle,
   wherein the processor assesses criticality of a current situation for the autonomous vehicle by analyzing the sensor data and determines processing capability of the processor based on the assessment of criticality of the current situation, and
   wherein the processor determines whether to log sensor data in the first memory or to, instead, hold sensor data in a second memory until a future time to be determined, wherein the determination to store or hold is based on the determined criticality of the current situation to reduce the load on processing capability of the processor, wherein the first memory is a hard drive and the second memory is a RAM.

2. The on-board computer system of claim 1, wherein the assessment of criticality of the current situation includes analyzing sensor data that indicates a number of objects in a vicinity of the autonomous vehicle.

3. The on-board computer system of claim 2, wherein if the assessment of criticality of the current situation indicates the number of objects in a vicinity of the autonomous vehicle exceed a threshold value of number of objects the processor stops logging data in the first memory and holds sensor data in the second memory until the number of objects fall below the threshold value.

4. The on-board computer system of claim 1, wherein the assessment of criticality of the current situation includes analyzing sensor data that indicates time to collision of the autonomous vehicle.

5. The on-board computer system of claim 4, wherein if the assessment of criticality of the current situation indicates the time to collision of the autonomous vehicle exceeds a threshold value of time to collision the processor will stop logging data in the first memory and begin holding sensor data in the second memory until the time to collision rises above the threshold value.

6. The on-board computer system of claim 1, wherein if the processor determines a collision is imminent the processor will continue to log sensor data in the first memory.

7. The on-board computer system of claim 1, wherein a frequency of the processor logging sensor data varies depending on the assessment of criticality.

8. The on-board computer system of claim 1, wherein the processor determines whether to log sensor data in the first memory or hold sensor data in a second memory until the future time to be determined to log sensor data in the first memory based on an evaluation of the determined criticality of the current situation and the space of the second memory.

9. The on-board computer system of claim 1, wherein the plurality of sensors comprises Lidar technology.

10. The on-board computer system of claim 1, wherein the processor determines whether to log less sensor data if there is a critical amount of space being reached in the second memory.

11. A method of logging sensor data from a plurality of sensors on an autonomous vehicle, the method comprising:
    logging sensor data received from the plurality of sensors of the autonomous vehicle, wherein the autonomous vehicle includes a computer coupled to the plurality of sensors to receive the sensor data, and the computer has a first memory, a second memory, and a processor;
    assessing of criticality of a current situation for the autonomous vehicle by the processor analyzing the sensor data;
    determining processing capability of the processor based on the assessment of criticality of the current situation; and
    determining whether to log sensor data in the first memory or to, instead, hold sensor data in the second memory until a future time to be determined, wherein determining to store or hold is based on the determined criticality of the current situation to reduce the load on processing capability of the processor, wherein the first memory is a hard drive and the second memory is a RAM.

12. The method of claim 11, wherein the assessment of criticality of the current situation includes analyzing sensor data that indicates a number of objects in a vicinity of the autonomous vehicle.

13. The method of claim 12, wherein if the assessment of criticality of the current situation indicates the number of objects in a vicinity of the autonomous vehicle exceed a threshold value of number of objects the processor will stop logging data in the first memory and begin holding sensor data in the second memory until the number of objects fall below the threshold value.

14. The method of claim 11, wherein the assessment of criticality of the current situation includes analyzing sensor data that indicates time to collision of the autonomous vehicle.

15. The method of claim 14, wherein if the assessment of criticality of the current situation indicates the time to collision of the autonomous vehicle exceeds a threshold value of time to collision the processor will stop logging data in the first memory and begin holding sensor data in the second memory until the time to collision rises above the threshold value.

16. The method of claim 11, wherein if the processor determines a collision is imminent the processor will continue to log sensor data in the first memory.

17. The method of claim 11, wherein a frequency of the processor logging sensor data varies depending on the assessment of criticality.

18. The method of claim 11, wherein the processor determines whether to log sensor data in the first memory or hold sensor data in a second memory until the future time to log sensor data in the first memory based on an evaluation of the determined criticality of the current situation and the space of the second memory.

19. The method of claim 11, wherein the plurality of sensors comprises Lidar technology.

20. The method of claim 11, wherein the processor determines whether to log less sensor data if there is a critical amount of space being reached in the second memory.

* * * * *